United States Patent

Tobe et al.

[11] 3,892,790
[45] July 1, 1975

[54] COMPOSITIONS CONTAINING PLATINUM

[75] Inventors: Martin Leslie Tobe, Northwood; Abdul Rauf Khokhar, London; Peter David Michael Braddock, Wigan, all of England

[73] Assignee: Rustenburg Platinum Mines Limited, Johannesburg, South Africa

[22] Filed: Apr. 9, 1973

[21] Appl. No.: 349,186

[30] Foreign Application Priority Data

| Apr. 10, 1972 | United Kingdom | 16349/72 |
| Apr. 27, 1972 | United Kingdom | 19656/72 |
| May 8, 1972 | United Kingdom | 21388/72 |
| June 26, 1972 | United Kingdom | 29920/72 |
| Sept. 8, 1972 | United Kingdom | 41798/72 |

[52] U.S. Cl. .............................. 260/429 R; 424/287
[51] Int. Cl.² .................... C07E 15/00; C07F 87/34
[58] Field of Search ................................. 260/429 R

[56] References Cited
OTHER PUBLICATIONS

Lifschitz et al., Zanorg Chem. 233 (1937), p. 12, 32, 33, Ginehim Handbuch der Amorganishen Chemie 68D (1957), Verlay Chemie Wunheim pp. 266–278.
Chemical Abstracts 74 (1971) No. 68420v.
Rosenberg et al., Nature 222 (1969) pp. 385–386.

*Primary Examiner*—Arthur P. Demers
*Attorney, Agent, or Firm*—Cushman, Darby & Cushman

[57] ABSTRACT

This invention describes a composition which is active against ADJ/PC6 tumors in mice comprising a cis coordination compound of platinum having the structure

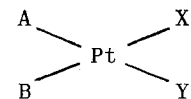

in which X and Y are halogenoid groups which are the same or different and A and B are the same or different alicyclic amine groups co-ordinated to the Pt through their N atoms each having the general formula

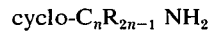

in which $n$ may vary from 3 to 7 and in which all of the R groups are either the same of different and are preferably all hydrogen but may be selected from the group consisting of hydrogen, alkyl, aryl, alkanyl, aralkyl, halogen, pseudohalogen, hydroxy, carbonyl, formyl, nitro, amido, amino, sulphonic acid, sulphonic acid salt, carboxylic acid, carboxylic acid salt, and substituted alkyl, aryl, alkaryl and aralkyl groups.

14 Claims, No Drawings

COMPOSITIONS CONTAINING PLATINUM

This invention relates to new compositions of matter which are active against ADJ/PC6 tumours in mice and to methods of preparation and use of such compositions.

According to the present invention the composition comprises a cis co-ordination compound of platinum having the structure:

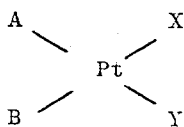

in which X and Y are halogenoid groups which are the same or different and are preferably both chloride but may be other halide, pseudohalide such as cyanide, cyanate, thiocyanate or azide or other similar group A and B are the same or different alicyclic amine groups or C-substituted alicyclic amine groups co-ordinated to the Pt through their N atoms each having the general formula:

$$\text{cyclo-}C_nR_{2n-1}NH_2$$

in which $n$ may vary from 3 to 7 and in which all of the R groups are either the same or different and are preferably all hydrogen but may be selected from the group consisting of hydrogen, alkyl, aryl, alkaryl, aralkyl, halogen, pseudohalogen, hydroxy, carbonyl, formyl, nitro, amido, amino, sulphonic acid, sulphonic acid salt, carboxylic acid, carboxylic acid salt, and substituted alkyl, aryl, alkaryl and aralkyl groups.

Although R groups other than hydrogen are not normally preferred, they may be used and may comprise lower alkyl such as methyl or ethyl groups or a solubilizing group such as a sulphic acid group. Solubilizing groups as substituents such as carboxylic acid, sulphonic acid, carboxylic acid salt, sulphonic acid salt, e.g. the sodium, potassium or lithium salts, are sometimes appropriate when the clinical conditions require high solubility.

Throughout the specification and claims, the term "halogenoid" is used to mean halide or pseudohalide such as cyanide, cyanate, thiocyanate or azide.

Cis-dichloro diamine platinum (II) is a known antineoplastic compound having a therapeutic index of 8.1. The biological data for the bis(cyclopropylamine), bis(cyclobutylamine), bis(cyclopentylamine), bis(cyclohexylamine) and bis(cycloheptylamine) derivatives of the cis dichloro Pt (II) complexes, i.e.

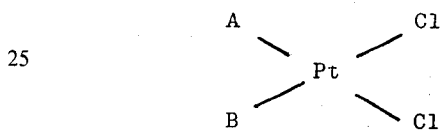

where A and B are identical and consist of $C_3$–$C_7$ alicyclic primary amine, are given below with comparative data for chemically similar compounds when tested against ADJ/PC6 plasma cell tumour in mice:

SUMMARY OF ACTIVE PLATINUM COMPOUNDS ON THE ADJ/PC6 PLASMA CELL TUMOUR

| Name | Formula* | Vehicle | Rt. | Dose (single) mg/Kg | $ED_{90}$ mg/Kg | $LD_{50}$ mg/Kg | TI | Mean Tumour Wt. As % Of Control | % Inhib | Remark |
|---|---|---|---|---|---|---|---|---|---|---|
| cis-Dichloro-diammine platinum (II) | [Pt(NH₃)₂Cl₂] | Oil | i.p | 0.15625 | 1.60 | 13 | 8.1 | 116.7 | -16.7 | |
| | | | | 0.3125 | | | | 50 | 50 | For |
| | | | | 0.625 | | | | 69 | 31.0 | com- |
| | | | | 1.25 | | | | 16.4 | 83.4 | pari- |
| | | | | 2.5 | | | | 2.4 | 97.6 | son |
| | | | | 5 | | | | 0.7 | 99.3 | |
| | | | | 10 | | | | 0 | 100 | 1D/3 |
| | | | | 20 | | | | 3D/3 | | |
| | | | | 40 | | | | 3D/3 | | |
| Dichloro[(DL)-cyclohexane (trans)-1,2-diamine] platinum (II) | | Oil | i.p | 0.3125 | 2.05 | 14.1 | 6.9 | 75.1 | 24.9 | |
| | | | | 0.625 | | | | 83.1 | 16.9 | |
| | | | | 1.25 | | | | 34.9 | 65.1 | For |
| | | | | 2.5 | | | | 0.4 | 99.6 | com- |
| | | | | 5 | | | | 0.8 | 99.2 | pari- |
| | | | | 10 | | | | 0.4 | 99.6 | son |
| | | | | 20 | | | | 3D/3 | | |
| | | | | 40 | | | | 3D/3 | | |
| cis-Dichloro-(bis-pyrrolidino) platinum (II) | | Oil | i.p | 3.125 | 10.8 | 14.1 | 13.1 | 68.6 | 31.4 | |
| | | | | 6.25 | | | | 26.0 | 74.0 | |
| | | | | 12.5 | | | | 5.9 | 94.1 | For |
| | | | | 25 | | | | 2.9 | 97.1 | com- |
| | | | | 50 | | | | 1.0 | 99.0 | pari- |
| | | | | 100 | | | | 1.5 | 98.5 | son |
| | | | | 200 | | | | 3D/3 | | |
| cis-dichloro-bis(cyclopropyl-amine) platinum (II) | | Oil | i.p | 1.25 | 2.3 | 56.5 | 24.6 | 54.4 | 45.6 | |
| | | | | 2.5 | | | | 4.0 | 96.0 | |
| | | | | 5 | | | | 2.5 | 97.5 | |
| | | | | 10 | | | | 0.5 | 99.5 | |
| | | | | 20 | | | | 1.5 | 98.5 | |
| | | | | 40 | | | | 1.5 | 98.5 | |
| | | | | 80 | | | | 3D/3 | | |

SUMMARY OF ACTIVE PLATINUM COMPOUNDS ON THE ADJ/PC6
PLASMA CELL TUMOUR
-Continued

| Name | Formula* | Vehicle | Rt. | Dose (single) mg/Kg | ED$_{90}$ mg/Kg | LD$_{50}$ mg/Kg | TI | Mean Tumour Wt. As % Of Control | % Inhib | Remark |
|---|---|---|---|---|---|---|---|---|---|---|
| cis-dichloro-bis-(cyclohexyl-amine) (II) platinum | | Oil | i.p | 10<br>50<br>250<br>1250 | <10 | 625/1250 | >125 | 3.4<br>2.0<br>1.5<br>0.5 | 96.6<br>98.0<br>98.5<br>99.5 | |
| cis-dichloro-bis-cyclopen-tylamine) platinum (II) | | Oil | i.p | 1.5<br>3.125<br>6.25<br>12.5<br>25<br>400<br>800<br>1600<br>3200 | 2.4 | 480 | 200 | 21.3<br>3.8<br>1.6<br>2.5<br>1.6<br>0.8<br>3D/3<br>3D/3<br>3D/3 | 78.7<br>96.2<br>98.4<br>97.5<br>98.4<br>99.2 | 1D/3<br>1D/3 |
| Dichlorobis-(cyclobutyl-amine) platinum (II) | | Oil | i.p | 6<br>30<br>150<br>750 | <6 | 67 | >11.1 | 1.6<br>1.6<br>3D/3<br>3D/3 | 98.4<br>98.4 | |
| cis-dichloro-bis-(cyclohep-tylamine) platinum (II) | | Oil | i.p | 5<br>25<br>125<br>625 | 18 | >625 | >34.7 | 41.5<br>2.2<br>1.6<br>2.7 | 58.5<br>97.8<br>98.4<br>97.3 | |

A repetition of the tests gave the following results:

| No. of Atoms in Ring | Structure | LD$_{50}$ | ED$_{90}$ | TI |
|---|---|---|---|---|
| 3 | H$_2$\Pt/Cl<br>H$_2$/Pt\Cl | 56.6 | 2.3 | 24.6 |
| 4 | H$_2$\Pt/Cl<br>H$_2$/Pt\Cl | 67 | <6 | >11.1 |
| 5 | H$_2$\Pt/Cl<br>H$_2$/Pt\Cl | 565.6 | 2.4 | 235.7 |
| 6 | H$_2$\Pt/Cl<br>H$_2$/Pt\Cl | >3200 | 12.0 | >267 |

The highest number of the series so far tested, the biscylohexylamine complex has the best therapeutic index so far seen with the platinum compounds. The value greater than 267 is, in fact, the highest index ever obtained in this system and makes the compound more than thirty times more selective against this tumour than the platinum complex at present on clinical trial.

In previous screening of compounds for anti-tumour activity, the PC6 tumour has been shown to be particularly sensitive to alkylating agents and especially to clinically useful ones such as melphalan and cyclophosphamide which have therepeutic indices of 166 and 136 respectively. The finding that the cis-dichlorobis-(cyclohexylamine) and bis(cyclopentylamine) platinum (II) complexes are highly active and nontoxic against the plasma cell tumour represents an important contribution The bis(cyclopentylamine) complex causes a 30% increase in survival time at optimum dose with the TL × 5 Lymphoma and causes regression of the sarcoma 180 at tolerated dose levels.

METHODS OF BIOLOGICAL TESTING

The new compounds were assayed against female BALB/c mice bearing the established ADJ/PC6A tumour by the method previously described in the article: Rosenoer, V.M., Mitchley, B.C.V., Roe, F.J.C. and Connors, T.A. "Walker carcinosarcoma 256 in study of anti-cancer agents." Cancer Res. Suppl., 26, pt.2, 937–941, 1966. Tumours were transplanted subcutaneously by means of tumour fragments and treatment commenced at 24 days after implantation when the tunours were approximately 2 gm in weight. In preliminary tests, six control animals were used and several groups of three treated animals. Several dose levels were given at five fold dose spacings and ranged from lethal to non-tumour inhibitory, allowing the calculation of LD$_{50}$ and ED$_{90}$ (minimum dose to cause 90% tumour regression) in the one experiment. The ratio LD$_{50}$/ED$_{90}$ is a therapeutic index and is a measure of the selectivity of the compound as an anti-tumour agent. Agents found to be active were then further tested using the same protocol but smaller intervals (two fold) between doses. This enabled the calculation of LD$_{50}$ and ED$_{90}$ with narrower fiducial limits. All compounds were administered intraperitoneally as a single dose suspended in arachis oil. The tumour inhibitory cis-dichlorodiammine platinum (II) served as a positive control. Tumours were dissected out and weighed ten days after drug treatment.

The tests were carried out on Balb/C white mice using three test mice for each dose level and a minimum of six untreated control mice.

An ADJ/PC6 plasma cell tumour taken from a sacrificed mouse is dissected free of superfluous tissue and cut under sterile conditions into approximately 10 milligram size pieces. The tissue pieces were then implanted by trocar in the left axillary region subcutaneously, in new mice. The mice were, on the average, approximately seven weeks old and weighed 18–20 grams. Taking day 0 as the day ot treatment (24 days after tumour implantation), the animals were sacrificed on day 10. The tumours were excised and weighed and the ratio of the weights of the tumours in the treated animals to the control set of animals was obtained.

In the test animals the compounds were injected on day 0 in oil, intraperitoneally. The volume of the injection is 1 ml per 100g. body weight.

$ED_{90}$ is the minimum dose causing a 90% regression in the size of the tumour. $LD_{50}$ is the dose level causing 50% deaths of the animals. The therapeutic index is $LD_{50}/ED_{90}$ and is a measure of the selectivity of the compound in question in treating the tumour. 1D/3 means one death in three animals; 3D/3means three deaths in 3 animals etc.

These results show that compounds according to the invention give exceptionally good results for antitumour activity and compare very favourably with chemically similar but structurally different compounds such as the dichloro [(DL) cyclohexane (trans)-1,2-diamine]platinum (II) and the cis dichloro bis(pyrrolidino)-platinum (II) given in the table of results for comparison.

PREPARATION OF PLATINUM COMPLEXES

The cis-dichlorobispyrrolidine, cyclopentyl-amine, cyclobutylamine and cyclohexylamine platinum (II) complexes were prepared by the following general method: Equivalent amounts (ca. 1 millimole) of potassium tetrachloroplatinate (II) and each amine pyrrolidine (pyrr) cyclopentylamine (cypam), cyclobutylamine (cybam) and cyclohexylamine (cyham) were stirred in aqeous solution at room temperature for several hours. Yellow crystalline precipitates were filtered off, washed with concentrated HCl (not necessary for pyrr), water, methanol, acetone and diethyl ether and dried in vaccuo.

| Complex | C% Found | C% Req. | H% Found | H% Req. | N% Found | N% Req. | Cl% Found | Cl% Req. |
|---|---|---|---|---|---|---|---|---|
| Pt.Cl$_2$pyrr$_2$ | 23.5 | 23.5 | 4.2 | 4.5 | 7.0 | 6.9 | 17.2 | 17.4 |
| Pt.Cl$_2$cypam$_2$ | 27.2 | 27.5 | 5.0 | 5.1 | 6.6 | 6.4 | 15.4 | 16.3 |
| Pt.Cl$_2$cybam$_2$ | 23.4 | 23.6 | 4.4 | 4.5 | 7.1 | 6.9 | 17.3 | 17.4 |
| Pt.Cl$_2$cyham$_2$ | 31.1 | 31.0 | 5.6 | 5.7 | 6.3 | 6.0 | 15.1 | 15.3 |

CIS-DICHLOROBIS(CYCLOPROPYLAMINE)-PLATINUM (II)

Cyclopropylamine hydrochloride (0.716g) in water (5ml) was added to a filtered solution of K$_2$PtCl$_4$ (1.68g) in water (15ml). Sodium bicarbonate (0.682g) was then added to liberate the base and the solution was allowed to stand at room temperature for one day. The mixture of black powder and yellow crystals was filtered from the solution and dissolved in hot concentrated HCl. The resultant yellow solution was refrigerated for three days and the lemon yellow, woolly needles which precipitated were filtered off, washed with water, acetone and ether and dried in vacuo (C, 18.7; H, 3.7; N, 7.6; Cl, 18.9%. C$_6$H$_{14}$Cl$_2$N$_2$Pt requires C, 19.0; H, 3.7; N, 7.4; Cl, 18.7%).

What we claim is:

1. A cis co-ordination compound of platinum having the structure

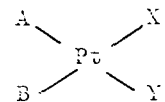

in which X and Y are halogen groups which are the same or different and A and B are the same or different alicyclic amine groups co-ordinated to the Pt through their N atoms each having the general formula:

cyclo—C$_n$R$_{2n-1}$ NH$_2$ in which n may vary from 3 to 7 and in which all of the R groups are either the same or different and are selected from the group consisting of hydrogen and methyl and ethyl.

2. A compound according to claim 1 in which X and Y are identical.

3. A compound according to claim 2 in which X and Y are both chloride.

4. A coupound according to claim 3 in which A and B are identical alicyclic amines.

5. A compound according to claim 1 in which A and B are different alicyclic amines.

6. A compound according to claims 4 in which the alicyclic amines are C-substituted in one or more positions.

7. A compound according to claims 4 in which all R groups are hydrogen.

8. A compound according to claim 6 in which the C-substituent is selected from the group consisting of methyl and ethyl.

9. A compound according to claim 4 in which $n = 3$ and R is hydrogen.

10. A compound according to claim 4 in which $n = 4$ and R is hydrogen.

11. A compound according to claim 4 in which $n = 5$ and R is hydrogen.

12. A compound according to claim 4 in which $n = 6$ and R is hydrogen.

13. A compound according to claim 4 in which $n = 7$ and R is hydrogen.

14. A method of preparation of a cis dichloro bis (cycloaliphatic amine) platinum (II) complex comprising the steps of addition of the cycloaliphatic amine hydrochloride to a solution of an alkali metal chloroplatinate, allowing to stand, dissolution of resultant solid in concentrated hydrochloric acid solution and refrigeration in order to precipitate the complex.

* * * * *